United States Patent [19]

Lynn

[11] 3,814,952

[45] June 4, 1974

[54] DUAL MODE VIDEO CLAMPING CIRCUIT

[75] Inventor: Dale Everett Lynn, Freehold, N.J.

[73] Assignee: Bell Telephone Laboratories, Incorporated, Murray Hill, N.J.

[22] Filed: Dec. 15, 1972

[21] Appl. No.: 315,490

[52] U.S. Cl. .......................... 307/237, 178/DIG. 26

[51] Int. Cl. .............................................. H03k 5/08

[58] Field of Search .............. 307/237; 178/DIG. 26

[56] References Cited

UNITED STATES PATENTS

| | | | |
|---|---|---|---|
| 3,463,940 | 8/1969 | Kaye et al. | 307/237 X |
| 3,555,299 | 1/1971 | Millward | 307/237 X |
| 3,681,619 | 8/1972 | Remy | 307/237 |

*Primary Examiner*—John Zazworsky

*Attorney, Agent, or Firm*—Daniel D. Dubosky

[57] ABSTRACT

Unclamped video signals are coupled to the first plate of a capacitor, the second plate of which is connected to a resistor which discharges it and to a clamping diode which limits the discharge in proportion to the potential of its other terminal. During the active interval, this potential is maintained at a first level by a forward-biased diode to ground. Blanking pulses bias the base of a transistor to a potential which reverse biases the diode to ground and which affords to the clamping diode the base voltage of the transistor less a base-emitter diode drop. Whenever graphics information is transmitted, the bias voltage of the transistor base is altered, as is the voltage supplied to the clamping diode. This alteration is achieved by means of a series combination of a resistor and a diode, connected to the transistor base, which, upon occurrence of graphics transmission, is coupled to a voltage supply.

9 Claims, 12 Drawing Figures

DUAL MODE VIDEO CLAMPING CIRCUIT

BACKGROUND OF THE INVENTION

This invention relates to video signal processing apparatus. More particularly, it relates to video clamping circuits.

Video processing systems, such as the PICTUREPHONE service video communication system, utilize in combination a camera, a clamping circuit, and an automatic gain control (AGC) circuit to synthesize signals with the desired characteristics. The camera scans the object to be televised and responsively thereto emits an electrical signal, the magnitude of which is proportional to the intensity of light reflected from the scanned object. The proportionality factor is determined by the opening of the camera iris. Hence, a relatively closed iris produces smaller current output for a given light intensity input, whereas a more open iris provides greater current for the same light intensity. The camera has a common saturation current for all iris openings, however, beyond which further increases in input light intensity bring about no change in camera output current.

At the camera output, in addition to preamplification apparatus, is a clamping circuit. It has been found that a more pleasing subjective performance results if each video frame contains at least a minimal amount of blackness. The clamping circuitry is therefore provided to identify the camera output corresponding to a current level which represents a black signal. Thus, the darkest portion of each frame is clamped to this black level, and the remainder of the signal is also shifted proportionally. In the majority of prior art systems, this clamping circuitry is operative only during the actively scanned portion of each video line.

In response to the clamping operation, an automatic gain control circuit compares the whitest portion of the clamped video signal with a level corresponding to "absolute white." By doing so, the AGC also measures just how much signal shift has occurred due to clamping, and is thereby able to adjust the iris of the camera to achieve a desired peak-to-peak signal. Thus, the combination of the clamping operation with the automatic gain control operation results in camera output signals which have a certain amount of blackness in every frame, and which also are of sufficient peak-to-peak amplitude for adequate tonal contrast.

In the prior art, problems arose with respect to the interaction of clamping and AGC apparatus whenever the video frame lacked substantial tonal gradient. In this situation, the clamping circuit operates to shift the darkest extremity of the signal down to an "absolute black" level, which in turn causes the AGC to open the iris considerably, for a clamped signal with small peak-to-peak requires substantial iris adjustment to achieve the desired signal amplitude. A problem arises, however, because of the camera saturation limitations: whenever the disparity between the peak-to-peak amplitude of the clamped signal and that desired is sufficiently large, the AGC causes the iris to be opened so wide that the camera saturates.

In response to this problem, improved clamping circuitry was developed which limits the amount of signal shift to which the camera output might be subjected due to clamping. For example, the clamping circuitry which has been in use for the PICTUREPHONE service video communication system has incorporated this feature. Like the other prior art circuits, a clamping level corresponding to "absolute black" is established during the active region. In addition, a separate clamping level is established during the blanking interval. During blanking, the output voltage of the camera preamplifier is constant, such that the clamping level which is then operative is assured always of operating upon a signal of the same amplitude. Preferably, the second clamping level is more negative than the first. In the case where saturation might result due to a lack of tonal gradient in the frame, the blanking interval clamping level is utilized to clamp the zero current pulse caused by camera blanking during retrace. This in turn limits the shift which is brought about by clamping, thereby establishing an "artificial gray" tone instead of the "absolute black" which would otherwise result. The AGC adjusts the iris to produce a white level as before. The insertion of an artificial gray level as a black reference limits the required peak output from the camera.

Problems may occur, however, due to the effect of certain properties of cameras with electronic zoom upon the saturation level which is effective. In a wide angle situation, a certain saturation level exists due to the camera properties. If a switch to a narrow angle situation occurs, the operative saturation level is lower than the one for wide angle situations. Hence, if an artificial gray level is chosen which provides satisfactory performance for the wide angle situation, it is likely that the same gray level will produce severe saturation problems in the narrow angle situation. Conversely, a satisfactory level for the narrow angle situation results in a picture having insufficient contrast in the wide angle mode.

In systems such as the PICTUREPHONE service system, face-to-face transmission is in either the wide or narrow angle situation, but graphics transmission is only in the narrow angle mode. However, due to the different video characteristics of the respective types of picture, different signal amplitude ranges are required for each.

It is therefore an object of the present invention to provide video clamping apparatus which exhibits adequate performance in both the wide and narrow angle camera situations, while satisfying the constraints imposed on signal amplitude.

SUMMARY OF THE INVENTION

The present invention obviates the foregoing problems experienced by the diverse prior art clamping circuits by affording a freely variable clamping level during the blanking interval. Like the majority of prior art systems, a first clamping level which corresponds to "absolute black" is operative during the active region. During the blanking interval, under normal circumstances, a different clamping level is utilized in the manner of that shown in the prior art PICTUREPHONE service system. In addition, apparatus is provided whereby a different clamping level is operative during blanking whenever certain classes of video signal are being produced by the camera. For example, if graphics information is being scanned, the normally negative blanking interval clamping level is shifted toward zero volts, thereby further limiting the DC shift incurred by the video signal due to the clamping operation, and establishing a brighter level of "artificial gray." In this fashion, an acceptable differential between the whitest portion of a graphics line, as clamped, and the "absolute white" levels utilized by the automatic gain control is achieved. Consequently, camera saturation is obviated in both modes without compromising contrast of the picture in either.

In an illustrative embodiment of the present invention, unclamped video signals having a positive DC level are applied to a first plate of a capacitor. The second plate of the capacitor is coupled through a resistor to a negative potential source, and to a diode (hereinafter referred to as a clamping diode). The clamping diode in turn is coupled to a variable positive reference potential. So long as the second plate of the capacitor is more than 0.6 volt less than the positive potential supplied to the clamping diode, the resistor discharges the second plate of the capacitor, thereby shifting the video signals in a negative direction. When enough shifting occurs for the clamping diode to be forward biased, the negative extremities of the signals are thereby clamped to a level 0.6 volt less than the positive reference potential afforded to the clamping diode. In particular, that positive potential assumes one of three distinct levels, depending upon the video conditions. During the active scanning interval, a first reference potential is established by means of a forward-biased second diode connected from the clamping diode to ground. During blanking intervals, the diode to ground is reverse biased by a transistor, and the reference potential provided to the clamping diode is the voltage at which the transistor base is biased, plus its base to emitter drop. Finally, during the blanking interval when graphics mode is utilized, the second diode remains reverse biased and the transistor remains conducting. The bias level of the transistor base is varied, however, and the reference potential is similarly changed. In particular, the means whereby the bias voltage of the transistor base is changed is a diode-resistor series combination connected to a positive voltage source. Whenever a graphics mode is utilized, this third diode is forward biased, and the resistor regulates the amount of current furnished the transistor base. In this fashion, the effective clamping level is varied between three separate levels.

It is a feature of the present invention that camera saturation problems resulting from interaction of clamping circuitry with automatic gain control circuitry are eliminated without compromising contrast. Moreover, this is accomplished by variation of clamping levels, such that a large variety of video conditions may be accounted for by the designer by an adjustment of a resistor magnitude.

DETAILED DESCRIPTION

Figure 1:
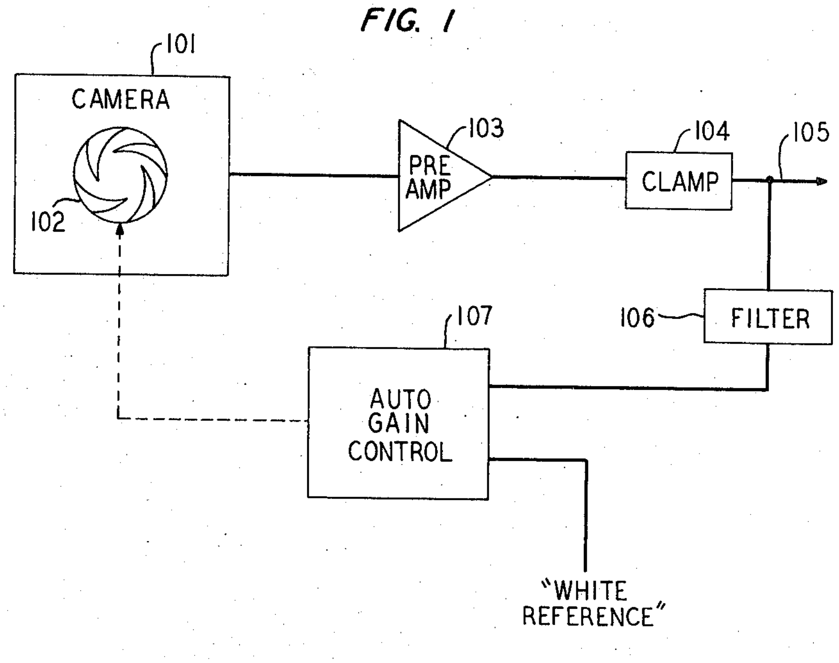
FIG. 1 shows a feedback loop which is typical of video transmitter apparatus.

FIG. 1 shows in block diagrammatic form apparatus which is typical of video transmission arrangements. A camera 101 scans the object to be televised and produces an output current responsively thereto. Generally, the current output of the camera is directly proportional to the intensity of light reflected from the scanned object. The camera 101 includes an iris 102 which regulates the amount of light actually received by the camera. In other words, the degree of opening of the iris 102 determines the proportionality factor between input light and output current of the camera 101.

Figure 2:
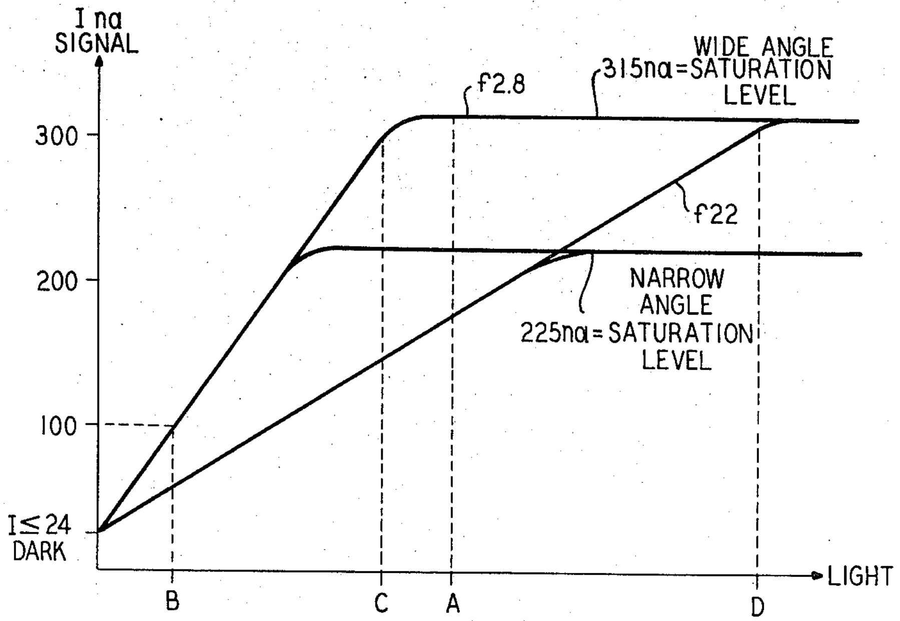
FIG. 2 shows typical characteristic curves of camera light input versus current output.

A representative set of camera characteristic curves of input light versus output current is shown in FIG. 2. Input light to the camera is represented on the abscissa, and output current is represented on the ordinate. The two curves shown, marked "*f*22" and "*f*2.8" represent the extreme conditions for the iris. In particular, the *f*22 curve represents the most closed iris position, while the *f*2.8 curve represents the most open iris position. Between the designated *f*22 and *f*2.8 curves is a continuum of intermediate curves representing corresponding iris openings.

In FIG. 2, two separate saturation levels are shown. First, for the wide angle mode of operation, a 315 *na.* level occurs. Secondly, for a narrow angle mode of operation, the operative saturation level is 225 *na.* For each mode, regardless of the light intensity presented at the camera input, no current greater than the associated saturation level may be produced at its output. For example, if light corresponding to level A on the abscissa is received by the camera operating in wide angle (WA) mode when the iris is set at *f*22, a signal of approximately 170 *na.* is produced at the camera output. If, however, light corresponding to level A is received while the camera is set at *f*2.8, the camera goes into saturation and produces at least 315 *na.* of output current. The significance of the transfer characteristic shown in FIG. 2 will be discussed in more detail hereinafter.

In FIG. 1, waveforms from the camera 101 are first coupled to a preliminary amplifier, i.e., pre amp, 103. The pre amp 103 merely affords a predetermined amplification to achieve peak-to-peak voltage levels of desirable magnitude for the remainder of the apparatus. It shall be assumed that a waveform representing a full spectrum of light, from white to black, has, at the output of pre amp 103, a peak-to-peak amplitude of 5.1 volts during face-to-face transmission and 3.6 volts during graphics transmission. Signals from the pre amp are coupled to a clamping circuit 104. It is the function of the clamping circuit 104 to insure that at least some black occurs in every frame. This clamping is provided because it has been found that video pictures have a more pleasing subjective appearance if they incorporate at least a minimal amount of black. As has been outlined hereinbefore, the principles of the present invention are embodied in the clamping circuit 104.

In addition to being coupled to an output 105 for transmission, the clamped video signals are coupled to a feedback loop including a filter 106. From the filter they are coupled to a first input of an automatic gain control (AGC) circuit 107. The AGC continuously compares the amplitude of the clamped video signal with a reference voltage corresponding to absolute white. Thus, the AGC functions to evaluate the difference between the prevailing amplitude of the clamped video signals with a reference potential corresponding to white light. In response to the disparity between the amplitude of the clamped video signal and the white reference, the AGC 107 varies the opening of the camera iris 102. Hence, the total effect of the AGC 107 is to maintain a rather constant amplitude signal at the camera output despite variations in brightness of the light reflected from the scanned object. If the light received tends to get brighter, and the disparity between the amplitude of the clamped camera output and the white reference gets greater, the AGC 107 tends to close the iris 102 so the resulting picture will not be over exposed.

Problems brought about in the prior art through the interaction of the clamping circuit 104 and the AGC 107 may be better appreciated in a general context if the characteristic curves of FIG. 2 are considered in conjunction with realistic signal constraints imposed upon the system as a whole. It shall be assumed that the desired peak-to-peak amplitude of a signal in face-to-face transmission is 5.1 volts, corresponding to a camera output of 200 *na.* for signals which include the full black to white intensity range. For graphics transmission, the desired full brightness range peak-to-peak amplitude is 3.6 volts, corresponding to a camera output of 141 *na.* Hence, the white reference supplied to the automatic gain control 107 is 5.1 v. when face-to-face transmission is being accomplished, and 3.6 volts when graphics mode is utilized. The clamping level to which video signals normally are clamped is zero volts.

Under these constraints, if a video frame has signals of intensity varying between levels B and C in FIG. 2, camera saturation will not result. For any iris setting less than *f*2.8, such as *f*22, the desired peak-to-peak amplitudes (5.1 v. which corresponds to 200 *na.*) will not be attained. That is, at *f*22, only 100 *na.* camera output signal (or approximately 2.65 v. pre amp output) will result. Once this signal is clamped to zero volts, the comparison by the AGC 107 of the 2.65 v. peak with the 5.1 v. reference clearly indicates that the iris is not sufficiently open, and the AGC 107 thereupon causes further opening of the iris 102. This continues until the iris is opened to *f*2.8, at which time the desired peak-to-peak amplitude of 200 *na.*, or 5.1 v., has been obtained. Thereafter, if input lines have a broader intensity range, the AGC 107 will cause the iris to close proportionally. For such signals, saturation problems do not occur.

If, however, signals have a narrow light intensity range, saturation will occur in prior art circuits. For example, a frame having a range between light levels C and A on the abscissa of FIG. 2 will encounter camera saturation. When the clamping circuit 104 causes the negative signal extremity to be zero volts, the positive signal extremity is far less than the desired 5.1 v., regardless of the iris setting. In this circumstance, the AGC 107 continuously causes the iris to be opened in order to seek a full scale 5.1 v., 200 *na.* peak-to-peak range. For signals between light levels C and A, since this cannot be realized, the camera iris 102 inevitably is opened all the way to *f*2.8, at which time the camera is driven into saturation.

Figure 3A:
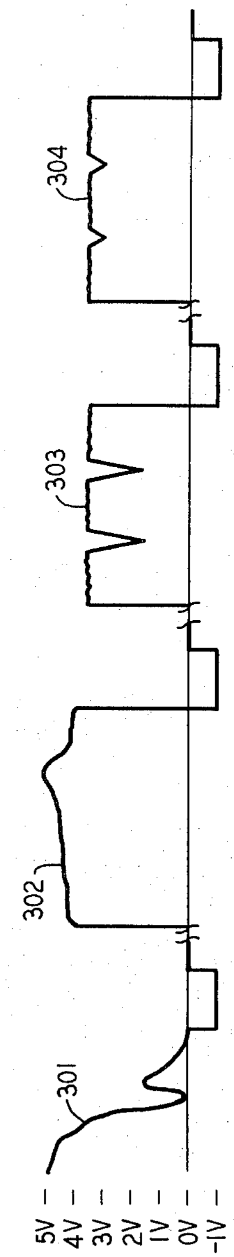
FIGS. 3A through 3G show voltage waveforms which demonstrate the effect the principles of the present invention have upon problems encountered by the prior art.

In response to the foregoing camera saturation problem, at least two approaches have been attempted which either reduce or eliminate the problem. These approaches may be appreciated by considering the waveforms of FIGS. 3A through 3G. Waveform 3A represents four different video lines, each of which has a distinct voltage range. Although shown in one waveform, these video lines are not sequential, and in fact, the signals represented are derived by viewing entirely different images. Voltage waveform 301 of FIG. 3A represents a line of face-to-face transmission which has a full complement of light intensity levels, from white to black. Hence, any operation which features clamping to black has no effect upon waveform 301. Waveform 302 of FIG. 3A is also representative of a video line in face-to-face transmission, but differs from that of 301 in that it has very little tonal gradient. Clearly, the voltages of waveform 302 vary only between approximately 4 v. and 5.1 v. Waveform 303 of FIG. 3A represents a normal line of graphics mode transmission. Hence, the background of white level is set at 3.6 v. and the negative going spikes represent dark lines on the picture. Waveform 304 also represents a video line in the graphics mode, but the negative going spikes thereof are considerably smaller than those of waveform 303, because waveform 304 represents transmission of graphics information such as common lead pencil markings, which are largely imperceptible to the normal cameras. Hence, while these marks possess considerable actual tonal disparity from the white background, the camera partially integrates the negative going spikes such that they appear in severely attenuated form. The negative plateaus following each of waveforms 301 through 304 represent the blanking interval between lines, during which intervals the camera output is zero current because the scanning beam is cut off during retrace.

Figure 3B:
Figure 3C:
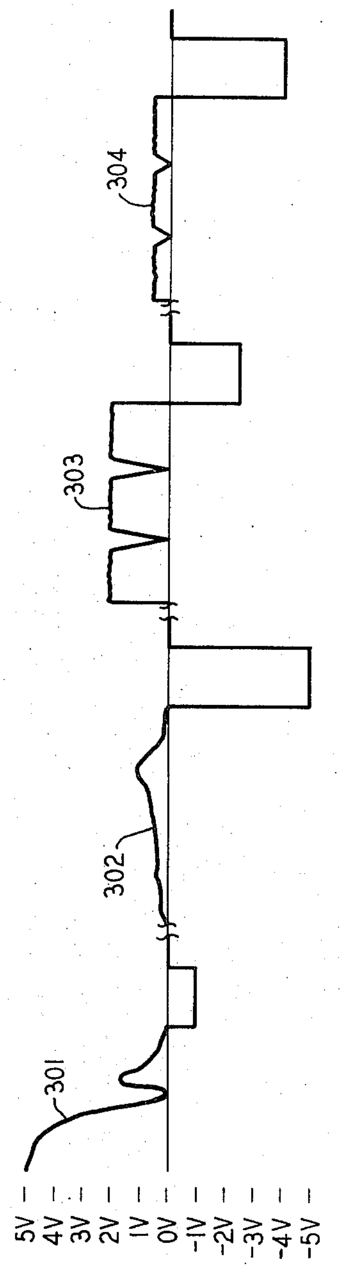

FIG. 3B illustrates the zero volt clamping levels which are provided in a majority of the prior art clamping circuits and which are considered hereinbefore. During the active interval, a zero volt clamping level is provided, but during the blanking interval, the clamping circuit is disabled and no clamping level is provided. The result of utilizing the clamping levels of FIG. 3B upon the waveforms of FIG. 3A is shown in FIG. 3C. Since waveform 301 has the full gamut of brightness levels, including black, it remains unaffected by the clamping operation. Waveform 302, however, is severely affected by the clamping operation, and is shifted to such an extent that its brightest magnitude, which had been 5.1 v. becomes only 1.1 v. Waveform 303 is also shifted downward by the clamping operation to the extent that its negative going spikes just penetrate the zero volt clamping level. In this situation, the peak value, which formerly was 3.6 v., becomes approximately 2 v. The lead pencil graphics waveform 304 is also severely affected by the clamping operation. Since the negative going spikes of waveform 304 are small, the result of clamping is that the whitest portion, which ideally is 3.6 v., becomes less than 1 v. It may be appreciated that when the clamped waveforms of FIG. 3C are applied to the first input of the AGC 107, the comparison of the peak voltage of the clamped signal with the reference has far reaching implications. While waveform 301 is unaffected by clamping, waveform 302 is severely shifted. Consequently, comparison of the 1.1 v. peak of waveform 302 with the 5.1 v. reference results in such a severe disparity that the camera iris 102 is opened wide. Like the signal exemplified in FIG. 2 as having light ranging between levels C and A, this shifting of waveform 302 results in camera saturation. Upon being applied to the AGC 107, waveform 303 is compared to the reference level for the graphics mode, 3.6 v. and may result in some opening of the iris 102. Under common circumstances, however, the disparity is not so great as to drive the camera into saturation. The case is quite different, however, for the clamped version of waveform 304, since the differential between the peak thereof, less than 1 v., and the reference of 3.6 v., is so substantial. Similarly, to the situation faced by clamped waveform 302, saturation results from the clamping of waveform 304.

Figure 3D:
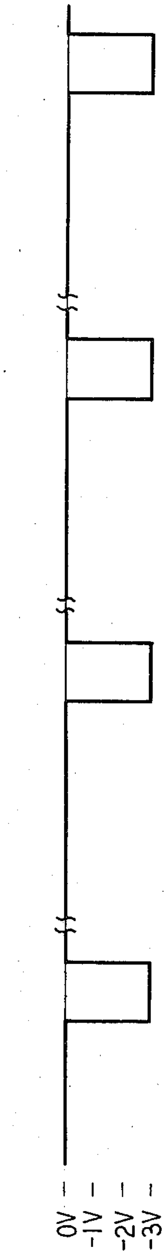
Figure 3E:
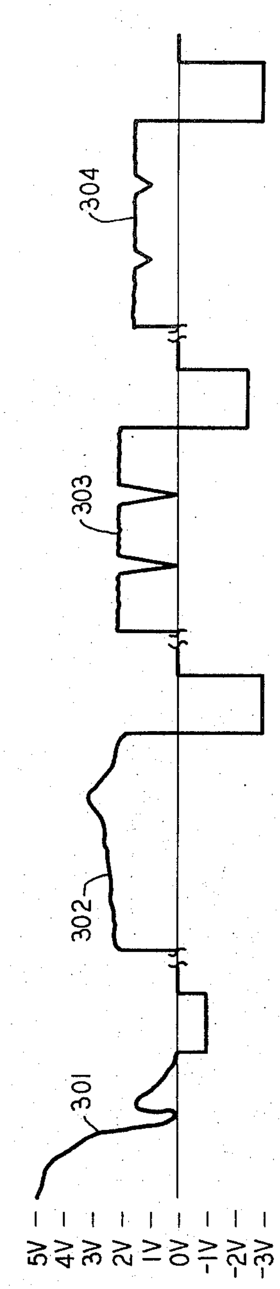

In response to the camera saturation difficulties exemplified by the waveforms of FIG. 3C, one solution has been proposed and has found use in PICTUREPHONE Service. This proposal features the addition of a second clamping level, i.e., an artificial gray level, operative during the blanking interval. As illustrated in FIG. 3D, the standard zero volt clamping level is utilized during the active interval, but a −3 v. level is provided during the blanking interval. This corresponds to an artificial gray level of 115 *na*. Since the camera output during blanking is zero amount due to camera blanking during retrace, the effect of the additional clamping level is to limit absolutely the amount of signal shift caused by clamping. The results brought on by use of the clamping levels of FIG. 3D are illustrated by the waveforms of FIG. 3E. Once more, waveform 301 is unaffected by the clamping operation. Waveform 302, however, is substantially affected, since the additional clamping level provided during blanking limits its signal shift, with the result that the brightest peak corresponds to 3.1, rather than 1.1, v. Thus, this operation may be viewed as clamping upon an artificial gray level of approximately 115 *na*. With this insertion, the disparity between the whitest portion of waveform 302 and the 5.1 v. reference level is sufficiently small that the camera iris 102 will not be opened so wide that saturation results.

Waveform 303 is unaffected by the additional blanking interval clamping level provided in FIG. 3D, but waveform 304 is somewhat affected thereby. While the brightest level of waveform 304 in FIG. 3C is less than 1 v., the provision for clamping during blanking causes its peak to be elevated to a level somewhat less than 2 v. It is noteworthy, however, that this limitation upon the voltage shift of waveform 304 is still insufficient to prevent camera saturation.

In summary, therefore, the addition of a −3 v. clamping level during blanking is effective to obviate for face-to-face signals which have little tonal gradient, but is ineffective in preventing the same problem from occurring in the narrow angle mode (NA) when certain graphics information such as lead pencil writing is present due to the lower saturation capability of the camera in the NA mode.

Figure 3F:
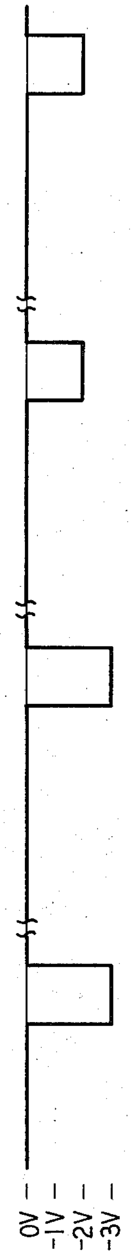

FIG. 3F illustrates the clamping levels which are afforded in accordance with the principles of the present invention. During the active interval, a standard zero volt clamping level is afforded. During blanking in the face-to-face mode, the familiar −3 v. clamping level is provided. A change occurs, however, during the blanking interval whenever graphics transmission is accomplished. During such times, the blanking interval clamping level is shifted to −2 v. which is equivalent to gray level of approximately 78 *na*. In this fashion, signals such as that of waveform 304 are limited further in experiencing voltage shift due to clamping, and concommitant camera saturation problems are avoided without reducing the contrast in either WA or NA.

Figure 3G:
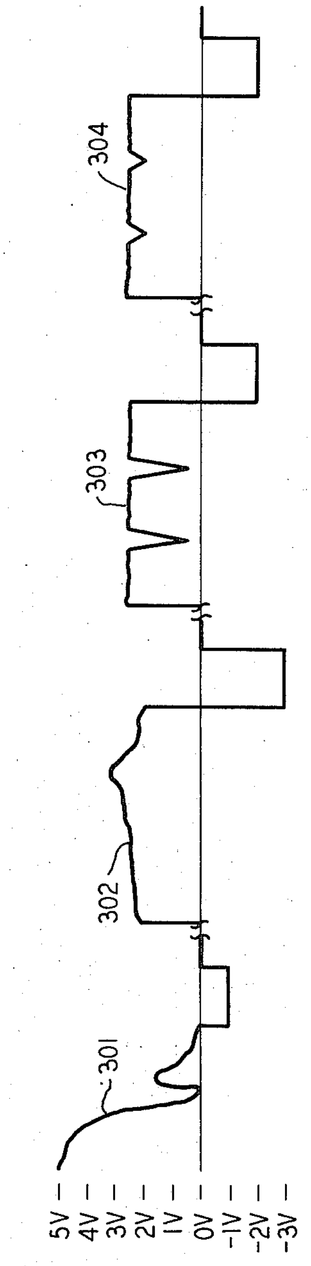

This effect is illustrated in FIG. 3G. Since there is no change in face-to-face clamping levels, waveforms 301 and 302 are the same as shown in FIG. 3E. Since the principles of the present invention take effect in the graphics mode, however, waveforms 303, and, particularly, 304 are substantially affected. The effect of the new level on waveform 303 is an upward shift of 1 v. (due to a shift in the inserted artificial gray level from 115*na.* to 78 *na.*), which results in its brightest level being slightly less than 3 v. Clearly, the disparity between this level and the 3.6 v. reference is not so substantial as to cause saturation. However, retention of the 115 *na.* level during face-to-face transmission prevents insufficient contrast which would result from a 78*na.* level during that time. Similarly, but to a greater extent, waveform 304 is limited in terms of attainable voltage shift such that its brightest level is also slightly less than 3 v. Thus, due to the small disparity between peak brightness level and the reference to which that level is compared by the AGC 107, the amount by which the iris will be opened is limited, and the camera saturation problem is prevented from occurring without compromising the contrast of the face-to-face picture.

Figure 4:
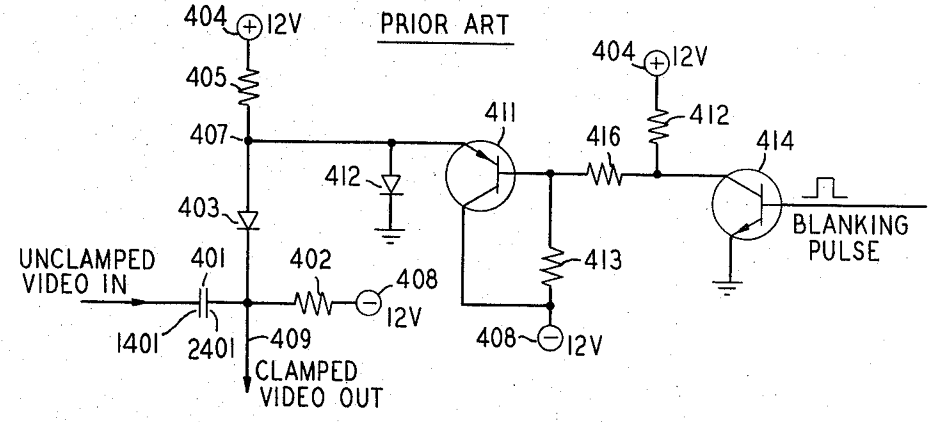
FIG. 4 shows a prior art video clamping circuit.

The circuit utilized in the PICTUREPHONE Service Station Set to provide the prior art clamping levels exemplified in FIG. 3D is shown in schematic form in FIG. 4. Unclamped video signals are coupled to a first plate 1401 of a capacitor 401. The other plate 2401 of the capacitor 401 is connected both to a resistor 402 and a "clamping" diode 403. The resistor 402 is in turn connected to a −12 v. supply 408. Since the video signals have positive DC levels falling between zero and 5.1 v., the effect of connecting the second plate 2401 of capacitor 401 through resistor 402 to the negative voltage supply 408 is continuously to attempt to discharge plate 2401. Clearly, so long as the clamping diode 403 is reverse biased, the DC level of the video signals applied to capacitor 401 shifts toward the voltage of the negative supply 408. At a certain point, however, the diode 403 will become forward biased and allow current to flow from the positive 12 v. source 404 through a resistor 405 and onto the second plate 2401 of a capacitor 401. This operation effectively terminates the discharging of capacitor 401 by the negative supply 408. At such time, however, as sufficient charge is placed on plate 2401 to reverse bias diode 403, the discharging effect of the negative supply 408 resumes.

In summary, the combination of capacitor 401 with resistor 402, diode 403, and negative supply 408 functions as a rather standard clamping arrangement. The time variant video signal applied to the capacitor 401 is shifted negatively until its negative extremities cause diode 403 to be forward biased, at which time the negative shift is discontinued. Thus, the video signals as represented at an output 409 are said to be clamped to the voltage at which diode 403 is biased. Clearly, the voltage at which diode 403 becomes forward biased is dependent upon the voltage at which node 407 is maintained. That is, whenever the second plate 2401 becomes less than 0.6 v. below the potential of node 407, diode 403 is forward biased and current is permitted to flow from the positive supply 404 through resistor 405 and diode 403, and onto the second plate 2401 of capacitor 401.

The reference potential at which node 407 is maintained is determined by the interaction of a PNP transistor 411 with a second diode 412. The transistor 411 has its collector maintained at the negative potential of supply 408, and has its base biased by a set of resistors 412, 413 and 416 at some voltage intermediate those of the two supplies 404 and 408. In addition, the base of transistor 411 is controlled by an NPN transistor 414 which in turn is energized by the occurrence of positive-going pulses which correspond to video blanking pulses.

The magnitudes of resistors 412, 413, and 416 are chosen such that, during the active scan, the base of transistor 411 is biased at a +2 v. During this time, transisotr 414 is turned off, and the conduction of current from positive source 404 through resistor 405 causes diode 412 to be forward biased. Hence, the base-to-emitter voltage of the p-n-p transistor 411 is +1.4 v., and the trnasistor remains in an off condition. Therefore, during the active scan, the potential at which node 407 is maintained is the forward diode drop provided by diode 412, and, due to the forward drop of the clamping diode 403, a clamping voltage of zero volts is maintained at the second plate 2401 of capacitor 401.

During the blanking interval, a pulse with a positive excursion is applied to the base of transistor 414, thereby causing it to be saturated. This causes the collector of transistor 414 to be drawn approximately to +0.3 v., setting up a voltage differential with negative supply 408, which is in turn divided between resistors 416 and 413, thereby causing transistor 411 to be shifted into a conducting state with approximately −3 v. on its base. The potential of node 407 is thereby drawn to a voltage of −2.4 v. Due to the forward drop of the clamping diode 403, a clamping voltage of −3 v. is established at the second plate 2401 of the input capacitor 401.

In summary, the prior art circuit of FIG. 4 establishes a zero volt clamping level during the active interval, and a −3 volt clamping level during the blanking interval. This circuit, therefore, has the effect demonstrated in FIGS. 3D and 3E. As was shown hereinbefore, however, the circuit of FIG. 4 with its artificial gray level of 115 *na.*, though suitable for the wide angle mode, is likely to cause camera saturation problems during use of the narrow angle mode, since that mode is characterized by a reduced saturation capability.

Figure 5:
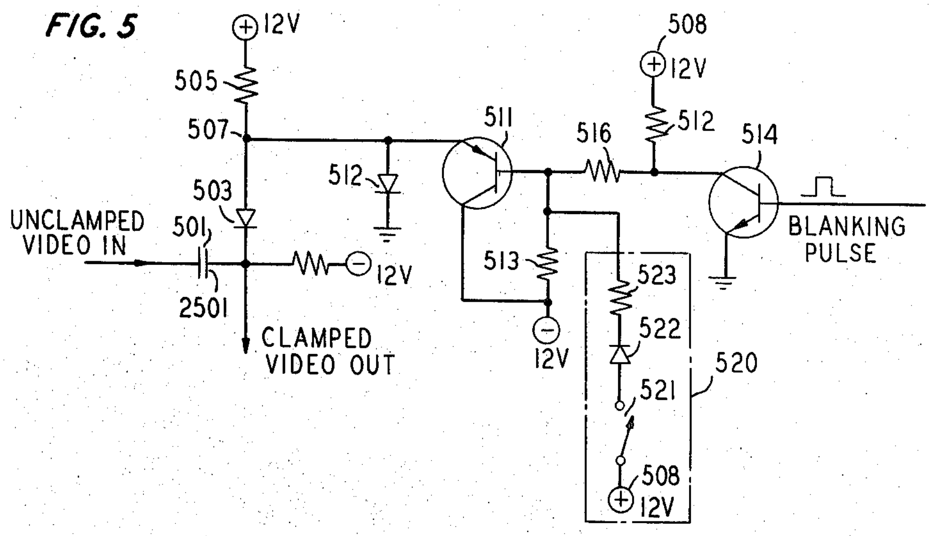
FIG. 5 shows a first illustrative embodiment of the principles of the present invention.

The circuit in FIG. 5 represents the same basic clamping circuit as is shown in FIG. 4, but also includes provision for the principles of the present invention. The elements of the FIG. 5 circuit which are identical in function to the circuitry of FIG. 4 are numbered similarly. For example, capacitor 501 in FIG. 5 performs the identical function as does the input capacitor 401 in FIG. 4. Likewise, the clamping diode 503 operates in conjunction with the remainder of the circuitry as did diode 403 in the prior art circuit of FIG. 4. The principle addition shown in the FIG. 5 circuit is the apparatus designated as block 520. In fact, this apparatus embodies the principles of the present invention.

During the active scan, diode 512 is forward biased and transistor 511 is turned off. Hence, during such times, node 507 is maintained at +0.6 v. In face-to-face transmission, during the blanking interval diode 512 is reverse biased due to the conduction of transistors 511 and 514. The potential of the base of transistor 511 is therefore maintained at −3 v., which also is the clamping voltage for plate 2501 of capacitor 501.

To utilize the graphics mode, a switch 521 is closed, thereby connecting the base of transistor 511 to the positive source of potential 508 through a diode 522 and a resistor 523. Resistor 523 is chosen such that the voltage at the base of transistor 511 is equal to the desired clamping voltage. In order to establish the −2 v. potential featured in the waveforms of FIGS. 3F and 3G, the following resistor values are utilized:

| RESISTOR | VALUE |
|---|---|
| Resistor 512 | 3.9 k. |
| Resistor 516 | 4.2 k. |
| Resistor 513 | 15.0 k. |
| Resistor 523 | 16.2 k. |

For these resistor values, the base of transistor 511 is held at approximately −3 v. in the blanking interval during face-to-face transmission, but is changed to approximately −2 v. during the blanking interval in graphics transmission.

As is evident from the foregoing discussion of the waveforms of FIGS. 3F and 3G, this effect prevents camera saturation when graphics information such as common lead pencil writing is utilized. It is clear, however, that the precise amount of clamping level shift which is brought about may be changed simply by varying the the magnitude of resistor 523. For example, the switch 521 may be rendered operative upon occurrence of any video situation (such as being responsive to apparatus for evaluating tonal gradient in a line), and the magnitude of resistor 523 be varied proportionally.

Figure 6:
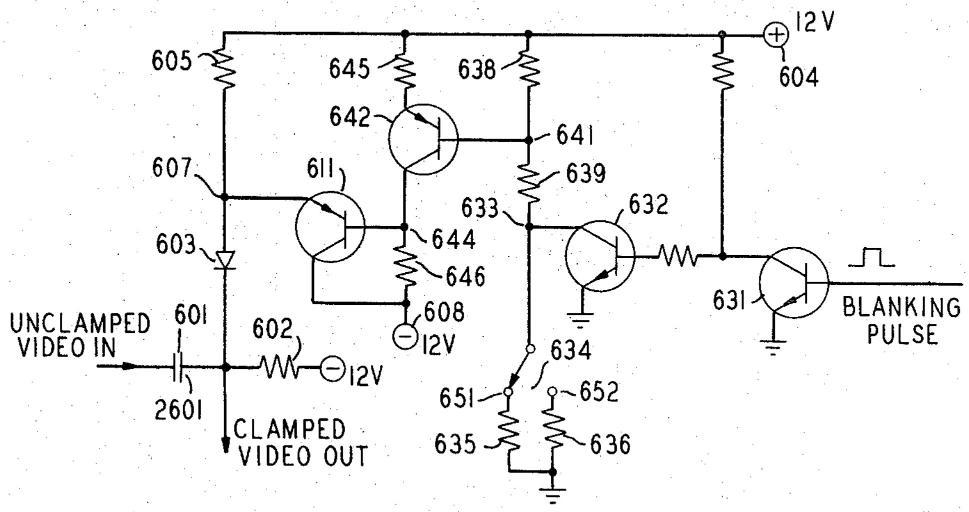
FIG. 6 shows a second illustrative embodiment of the principles of the present invention.

FIG. 6 shows a schematic diagram for a second illustrative embodiment of the present invention. Unclamped video signals are coupled to an input capacitor 601 which performs a basic clamping function in conjunction with a resistor 602 and a diode 603. The principles of the present invention are influential to establish a variable reference potential supplied to the clamping diode 603 by way of a transistor 611, and thereby to establish the potential at which the second plate 2601 of capacitor 601 clamps.

Pulses having positive voltage excursions are applied to the base of an NPN transistor 631 during each blanking period. Since the emitter of transistor 631 is maintained at ground potential, transistor 631 is maintained in a non-conducting state during the active interval, but is switched into conduction whenever the blanking pulse is applied at its base.

A NPN transistor 632 has its base biased by the voltage of the collector of the NPN transistor 631. Thus, during the blanking interval, when transistor 631 is conducting, the base of transistor 632 is near ground, thereby causing transistor 632 to be non-conducting. During the active intervals, however, when transistor 631 is non-conducting, the base of transistor 632 is forward biased and thereby is maintained in a saturated conducting state. Whenever transistor 632 conducts, the voltage of node 633 is fixed at a mere collector-to-emitter drop above ground potential, and the switch 634 along with resistors 635 and 636 is ineffectual. In the blanking interval, however, transistor 632 is turned off and the voltage of node 633 is determined by the position of the switch 634. That is, whenever transistor 632 is turned off, the operative circuitry is the path from the positive supply 604 through a pair of resistors 638 and 639 to node 633, and from there to the switch 634 and the one of resistors 635 or 636 to which the switch 634 is connected.

In summary, the potential at node 641 is determined by the position of a switch 634 and the conduction state of transistor 632. During the active interval, the potential of node 641 is substantially determined by a voltage division over resistors 638 and 639. During the blanking interval, however, the potential of node 641 is produced by a division of voltage between resistor 638 and a series combination of resistor 639 and one of the resistors 635 and 636.

Since the clamping level operative at the second plate 2601 of capacitor 601 is increased at node 607 merely by the forward drop of the clamping diode 603, it is clear that the voltage of the base of transistor 611, i.e., the voltage at node 644, is identical to the operative clamping voltage. That is, transistor 611 in conjunction with resistor 605 operates substantially similarly to transistor 411 with resistor 405 in FIG. 4 in the sense that it diverts currrent from the clamping diode and propagates the voltage at its base to the clamping diode. The major difference in the embodiment of FIG. 6 is that the voltage of node 644 is established by the current which passes through resistor 646, and therefore which is dependent upon the state of conduction of transistor 642. Hence, the voltage at node 641, the base of transistor 642, substantially determines the clamping voltage which will be extant at node 644 and therefore at capacitor 601.

In order to produce the waveforms of FIGS. 3F and 3G, therefor, node 644 must be at ground potential during the active interval, must be at −3 v. during the blanking interval in face-to-face transmission, and must be at −2 v. in the blanking interval during graphics mode transmission. These three conditions are established by providing three distinct current magnitudes, at appropriate times, through the resistor 646. It is clear, however, that the three current values through resistor 646 are substantially the same as the currents which will flow through resistor 645 and into the emitter of transistor 642. It is equally clear, however, that the base voltage of transistor 642 is merely a diode drop different from the I-R drop across resistor 645 so long as the transistor 642 conducts. Thus, careful choice of the component values for resistors 635, 636, 638, 639, and 645, along with resistor resistor 646, conclusively establish the three clamping voltages at node 644 and therefore at capacitor 601. In order to achieve the waveforms of FIGS. 3F and 3G, the following resistor values are utilized:

| RESISTOR | VALUE |
|---|---|
| Resistor 635 | 3.15 k. |
| Resistor 636 | 16.4 k. |
| Resistor 638 | 7.5 k. |
| Resistor 639 | 9.1 k. |
| Resistor 645 | 1.5 k. |
| Resistor 646 | 3.9 k. |

In this embodiment, resistor 635 is the one which is utilized whenever face-to-face transmission is conducted, and resistor 636 is utilized during the graphics mode transmission. Thus, switch 634 is maintained at terminal 651 during all face-to-face transmission, but is shifted to terminal 652 whenever graphics mode is utilized.

In summary, absence of a blanking pulse causes transistor 632 to be turned on, and, due to the magnitudes of resistors 638 and 639, maintains node 644 and capacitor 601 at a zero volt clamping level. During the blanking interval, transistor 632 becomes nonconducting and one of the resistors 635 and 636 determine the voltage at node 641 and therefore the clamping voltage on capacitor 5601.

It is clear that any number of resistors, corresponding to a large variety of video conditions, could be utilized along with resistors 635 and 636 to achieve a freely variable clamping level during blanking. For example, a continuously variable potentiometer could be utilized in response to an active means for estimating tonal gradient in a line (such as a standard peak-to-peak detector). Under such circumstances, the blanking interval clamping level would be incrementally varied by adjustment of the potentiometer in response to the determination of the tonal contrast by the peak-to-peak detector.

The foregoing embodiments are intended merely to be illustrative of the principles of the present invention. Numerous other embodiments may occur to those skilled in the art without departing from the spirit or scope thereof.

What is claimed is:

1. A video clamping circuit for use with a video signal having active and blanking intervals comprising:

means for establishing a first clamping level for the video signal during the active interval;

means for establishing a second clamping level for the video signal during the blanking intervals;

characterized in that said means for establishing a second clamping level includes a switching means for changing said second clamping level to a third clamping level when transmitting graphics information.

2. In a system which utilizes video signals divided into lines having active and blanking intervals, apparatus for providing a variable reference potential to a clamping diode comprising:

first and second sources of voltage;

means coupled to said first source of voltage for providing a first reference level of voltage to said clamping diode;

resistive voltage divider means including first and second resistors for dividing the voltage of said second source of voltage;

means, energized during video blanking intervals, for coupling the voltage on said second resistor to said clamping diode; and means, energized during the transmission of graphics information, for changing the voltage on said second resistor by supplying additional current thereto.

3. Apparatus as described in claim 2 wherein said means for changing includes:

a series combination of a third resistor and a second diode, said series combination being connected to said second resistor; and switching means, energized during transmission of graphics information, for coupling said series combination to said first source of voltage.

4. Apparatus for providing a variable reference potential to a clamping diode comprising:

a first voltage source;

a first diode connected to said clamping diode, and normally forward biased by said first voltage source, thereby affording a first reference potential to said clamping diode;

a transistor, normally non-conducting, having an emitter connected to saaid clamping diode;

means for energizing said transistor and for reverse biasing said first diode, thereby affording a second reference potential to said clamping diode; and means for altering the biasing voltage of the base of said transistor and thereby affording a third reference potential to said clamping diode.

5. Apparatus as described in claim 4 wherein said means for altering includes:

a second voltage source;

a series combination of a resistor and a second diode, connected to the base of said transistor; and switching means for coupling said series combination to to said second voltage source.

6. Apparatus for providing variable video clamping voltages to a clamping diode comprising:

a first transistor having its emitter connected to said clamping diode;

means including a second transistor for varying the bias voltage of the base of said first transistor;

means for varying the currrent in said second transistor including a third transistor, energized during active intervals, for maintaining the base of said second transistor at a first potential; and a plurality of switchable resistors for establishing at the base of said second transistor, during video blanking intervals, a corresponding plurality of reference potentials.

7. A clamping curcuit for use with a video signal having active and blanking intervals comprising a diode means having two electrodes, capacitor means for coupling said video signal to one of the two electrodes of said diode means, a potential source, first resistor means for coupling said one of the two electrodes of said diode means to said potential source, and means for coupling to the other of said two electrodes of said diode means one voltage level during said active interval and a second voltage level during said blanking interval characterized in that said means for coupling a first and second voltage level includes means for changing said second voltage level to a third voltage level during intervals when said video signal is derived from graphics information.

8. A clamping circuit as described in claim 7 wherein said means for changing includes:

a transistor having its emitter electrode connected to said other electrode of said diode means; and means for establishing first and second bias potentials at the base electrode of said transistor.

9. A clamping circuit as described in claim 8 wherein said means for establishing includes:

resistive voltage divider means for establishing a first bias potential at the base electrode of said transistor; and means, including a second resistor means connected to said base electrode of said transistor, a second potential source, and switching means for coupling said second resistor means to said second potential source, for establishing a second bias potential at the base electrode of said transistor by operating said switching means when said video signal is derived from graphics information.

* * * * *